United States Patent Office 2,800,140
Patented July 23, 1957

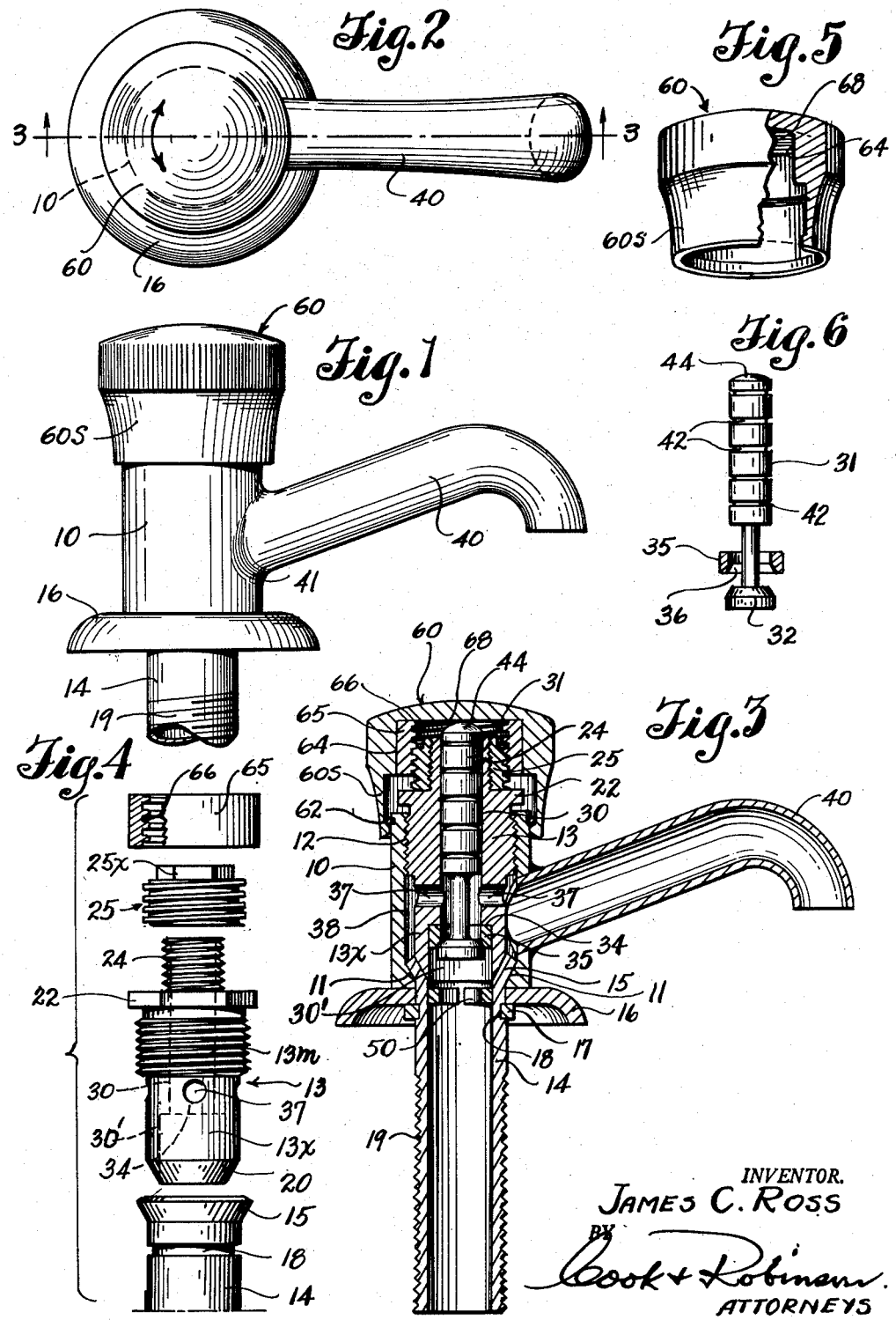

2,800,140

FAUCET

James C. Ross, Seattle, Wash.

Application December 15, 1952, Serial No. 326,073

4 Claims. (Cl. 137—454.5)

This invention relates to faucets for controlling the flow of liquids under pressure, and it has reference more particularly to faucets designed for regulating the flow of water as supplied under pressure to sinks, wash basins, and the like.

It is the primary object of this invention to provide an improved faucet whereby the volume of flow therethrough of the liquid which it controls can be accurately adjusted to any amount from a hair stream to its maximum flow, and to accomplish this easily and smoothly merely by the turning of a control knob associated with the faucet, and which faucet contains no packing, springs, gaskets or washers and is non-leaking.

It is also an object of the invention to provide improvements in construction of the various parts that permits the making of the faucet embodying the novel features of this invention, from bar stock.

A further object of the invention is to provide a faucet that is of all metal construction, and is composed of a minimum number of parts, that are easily machined and readily assembled.

Further objects and advantages of the invention reside in the simplification of construction of parts and in their combination and mode of operation, as will hereinafter be fully described.

The present application, in so far as the valve structure and self-cleaning operation is concerned, is in the nature of an improvement upon and may be considered as a continuation in part of my co-pending application filed under Serial No. 221,260 on April 16, 1951, and now abandoned.

In accomplishing the above mentioned and other objects of the invention, I have provided the improved details of construction, the preferred forms of which are illustrated in the accompanying drawings, wherein:

Fig. 1 is a side view of a faucet embodying the improvements of the present invention.

Fig. 2 is a top view of the same.

Fig. 3 is a vertical section of the faucet taken on the line 3—3 in Fig. 2.

Fig. 4 is a side view of some of the internal parts of the faucet, shown in dis-assembled relationship for better illustration of details.

Fig. 5 is a perspective view of the valve adjusting knob with a portion thereof broken away to better shown its interior formation.

Fig. 6 is a side view of the control valve member.

While faucets of the present kind may be used to control the flow of various liquids or fluids, they are most generally used to control flow of water as supplied under substantial pressure to sinks, tubs and the like, and are applied in the upright position herein shown, but not necessarily so.

Referring more in detail to the drawings—

The present faucet comprises a cylindrical, tubular body portion or housing 10 that is formed within its lower end portion with a rather steeply beveled and upwardly facing conical shoulder 11 that constricts the outlet at that end of the body. Within its upper end portion, the tubular body is threaded, as at 12, for the reception of the externally threaded plug 13, presently described in detail.

Extended into the lower end opening of the tubular body is a short length of tubing 14 serving as a mounting nipple for the faucet. This has its upper end portion conically flared to a slope exactly corresponding to the slope of the conical shoulder 11. This flared portion, designated at 15, seats flatly and in a fluid tight joint against the shoulder 11 as shown in Fig. 3. A flange plate 16 is applied about the tube 14 and is seated against the flat lower end surface of the housing 10, and is there held securely in place by means of a split ring 17 that is seated in an encircling groove 18 formed in the tube 14 a measured distance below the flared end portion thereof. The tube 14 is exteriorly threaded, as at 19, from its lower end to near the channel 18, as seen in Fig. 1, to receive a clamp nut or the like for the securing of the faucet in a base or panel. This threading of the nipple also provides for making connection with a liquid supply pipe in the usual manner.

The previously mentioned plug 13, is applied within the housing 10 as shown in Fig. 3. It comprises an exteriorly threaded medial portion as seen in Fig. 4, 13m, and a lower end portion 13x of somewhat reduced diameter that terminates at its lower end in a conically beveled, downwardly directed end surface 20. The surface 20 is adapted to fit within and against the inner surface of the conically flared upper end portion 15 of the tube or nipple 14 and to be tightened thereagainst in a liquid tight joint, thus not only to seal the joints at this location but also to hold the tube 14 functionally assembled with the housing 10 and without requiring supplementing gaskets or washers. The tightening of these parts together is accomplished by threading the plug 13 into the threaded upper end portion of the housing 10 as presently explained.

The body portion 13m of the plug 13 is formed at its upper end with a slightly extended wrench head portion 22 and continuing upwardly from this, coaxial of the plug, is an exteriorly threaded extension 24, onto which a sleeve 25 is threaded and, to prevent its turning in use, the sleeve is securely tightened against the flat top surface of the wrench head portion 22. Sleeve 25 has a reduced wrench head 25x at its upper end whereby it can be tightened.

The plug 13 is axially bored from end to end to provide a longitudinal channel 30 therein in which the stem portion 31 of the control valve member is slidably and rotatably fitted. At its lower end, the stem carries a valve head 32. The lower end portion of the plug is counterbored, to a substantial depth as at 30' to provide a lower end inlet to channel 30. The counterbore is here shown to be of the same diameter as the inside diameter of nipple 14, and the channel 30 to be of about one-half the diameter of the counterbore.

The counterbore 30' terminates in a flat downwardly facing shoulder 34 against which a hardened metal ring 35, that is press fitted in the counterbore, is firmly seated. This ring is formed with a downwardly facing conical seat 36 against which the valve head 32 is adapted to close in a liquid tight joint.

Opening laterally from the channel 30 are outlet ports 37. These open into an annular chamber 38 that is provided between the reduced lower end portion 13x of the plug and the enclosing housing 10. Leading upwardly and laterally from the housing is the discharge spout 40. The lower or inner end of this spout opens through the housing wall into the chamber 38 and the joint is sealed by suitable welding or brazing as at 41.

The valve head 32 is integrally formed with the valve stem, 31, and the stem, immediately above the valve head is substantially reduced in diameter in order to permit flow of liquid therealong to the ports 37. The upper end portion of the valve stem has a precision fit in the bore and at close intervals therealong is formed with encircling grooves 42 that aid in preventing leakage along the stem. At its upper end the stem terminates in a spherically rounded surface 44 and this extends above the upper end of the plug extension 24 as has been shown in Fig. 3.

The valve head 32 is limited in its movement away from the valve seat by a snap ring 50 that is press fitted in the upper end portion of the tube 15. The head is of lesser diameter than the counterbore 30' and, when open, permits ready flow of liquid to the channel 30.

When the valve head 32 is seated, it is held firmly in its closed position by the pressure of liquid against its lower surface. To adjustably open the valve, I have provided a hollow knob 60 that is applied over the upper end portion of the housing 10 and encloses the projecting upper end portion of the plug 13 therein. The knob is bored to form it with a depending skirt portion 60s that is telescopically fitted about the cylindrical upper end portion of the housing 10. The housing 10 is equipped about its upper end with an O-ring gasket 62 to frictionally seal the sliding connection between housing and knob skirt. The knob 60 is also counterbored to provide a socket 64 in its upper portion in which a ring or sleeve 65 is press fitted. This ring is interiorly threaded, as at 66, and is applied to the exteriorly threaded sleeve 25. Thus, by turning the knob in opposite directions, it is caused to be adjusted upwardly or downwardly relative to the housing 10 depending on its direction of turning.

The socket 64 of the knob has a flat upper end surface 68 and this engages against the rounded upper end 44 of the valve stem 31. Therefore, by a rotatable adjustment of the knob that moves it downward, the valve 32 can be opened accordingly. Then with any rotatable adjustment of the knob that moves it upwardly, the valve will be permitted to move toward closed position accordingly under pressure of liquid acting against its under surface as delivered thereto through nipple 14.

Faucets of this kind are especially suited for domestic uses for control of hot or cold water as supplied under pressure from city service systems. However, they likewise are useful for control of fluids of various kinds.

When a pipe system to which the faucet is connected is drained, as for preventing freezing, the valve will in ordinary usage, drop to open position, thus allowing the faucet chambers to drain as a precaution against damage by freezing.

Having thus described my invention, what I claim as new therein, and desire to secure by Letters Patent, is:

1. A faucet comprising a tubular body formed between its ends with an outlet, and within one end with an annular upwardly facing seat, an attaching nipple extended from said one end of the body and having a flared, inner end portion fitted in joint sealing contact against said seat, a valve carrier plug threaded into the tubular body from that end which is opposite said seat; said plug terminating at its inner end in a bearing surface that is fitted within and adapted to be tightened against the flared end portion of said nipple by inward threading of the plug to effect the pressure sealing of the joints at said one end of the body; said plug having an axial passage therethrough open to the nipple and an outlet from said passage communicating with the body outlet, a control valve at the inlet end of said passage, and having an actuating stem extended therefrom through said axial passage; and an adjustable means on the outer end of said plug operable against said stem for controlling the opening and closing movements of said valve.

2. A fluid control faucet comprising a tubular body providing a chamber with an outlet intermediate its ends, and formed within its lower end portion with an upwardly facing, annular, conically sloping seat, a tubular nipple extending downwardly from within the lower end portion of said body, and having a conically flared upper end portion fitted to said conically sloping seat, a plug threaded into the upper end portion of the body; said plug terminating at its lower end in a conically tapered surface that is contained within and fitted to the flared upper end portion of said nipple and adapted to be tightened thereagainst by inward threading of the plug to effect the pressure sealing of the body at that end; said plug having an axial bore therethrough and having outflow ports opening from said bore into said body chamber in communication with its outlet, a valve seat in the lower end of said bore, a valve disposed to close against said seat under pressure of the controlled fluid, a stem extending upwardly from the valve and slidably contained in said bore, and means adjustably mounted on the upper end of the plug, in operative engagement with said valve stem, and operable against the stem to effect the opening and control the closing movements of the valve.

3. A faucet comprising a tubular housing providing a chamber with a discharge outlet and formed within its lower end portion with an annular, upwardly facing, conically sloping seat, a tubular nipple extended downwardly from within the lower end portion of said housing and formed with a conically flared end portion that is fitted against said seat, a plug threaded into the upper end portion of said housing and having a downwardly extending, diametrically reduced portion, formed with a conically tapered lower end surface seated within and tightened against the flared end portion of the nipple in a sealed joint and pressing the latter against the seat in a sealed joint; said plug having a coaxial bore therethrough, and formed with a counterbore leading upwardly thereinto from its lower end, and there being outflow ports opening from the said bore through the diametrically reduced portion of the plug into the housing chamber, a downwardly facing valve seat in said counterbore surrounding the entrance to said bore, a valve stem having an upper end portion slidably fitted in the bore and extended from the upper end of the plug, and a valve head at the lower end of the stem adapted to close upwardly against the valve seat; an externally threaded sleeve fixedly applied to the upper end of the plug coaxial thereof and a hollow knob threaded onto said sleeve and engaging with the upper end of said stem and rotatably adjustable in opposite directions to effect the opening and control the closing action of the valve as effected by the medium under control.

4. A faucet as in claim 3 wherein the said plug has an upwardly extending portion of reduced diameter at its upper end about which said externally threaded sleeve is secured against turning, and wherein said knob is formed with a depending skirt portion that telescopically contains the upper end portion of the housing therein, and a friction gasket is applied between the skirt and housing.

References Cited in the file of this patent
UNITED STATES PATENTS

| | | |
|---|---|---|
| 321,761 | Shook | July 7, 1885 |
| 828,981 | Staaf | Aug. 21, 1906 |
| 1,555,005 | Gunther | Sept. 29, 1925 |
| 1,616,826 | Ross | Feb. 8, 1927 |
| 1,692,296 | Godsey | Nov. 20, 1928 |
| 1,694,234 | Schimmel | Dec. 4, 1928 |
| 1,801,383 | Winsor | Apr. 21, 1931 |
| 1,950,749 | Ross | Mar. 13, 1934 |
| 2,105,487 | Lozon | Jan. 18, 1938 |
| 2,359,017 | Balsiger | Sept. 26, 1944 |
| 2,509,671 | Christensen | May 30, 1950 |
| 2,559,405 | Crevatin | July 3, 1951 |
| 2,658,716 | Winfree | Nov. 10, 1953 |

FOREIGN PATENTS

| | | |
|---|---|---|
| 634,639 | Germany | of 1936 |